June 24, 1930.  C. H. CONGDON  1,766,167
AIRCRAFT
Filed Feb. 4, 1927    3 Sheets-Sheet 1
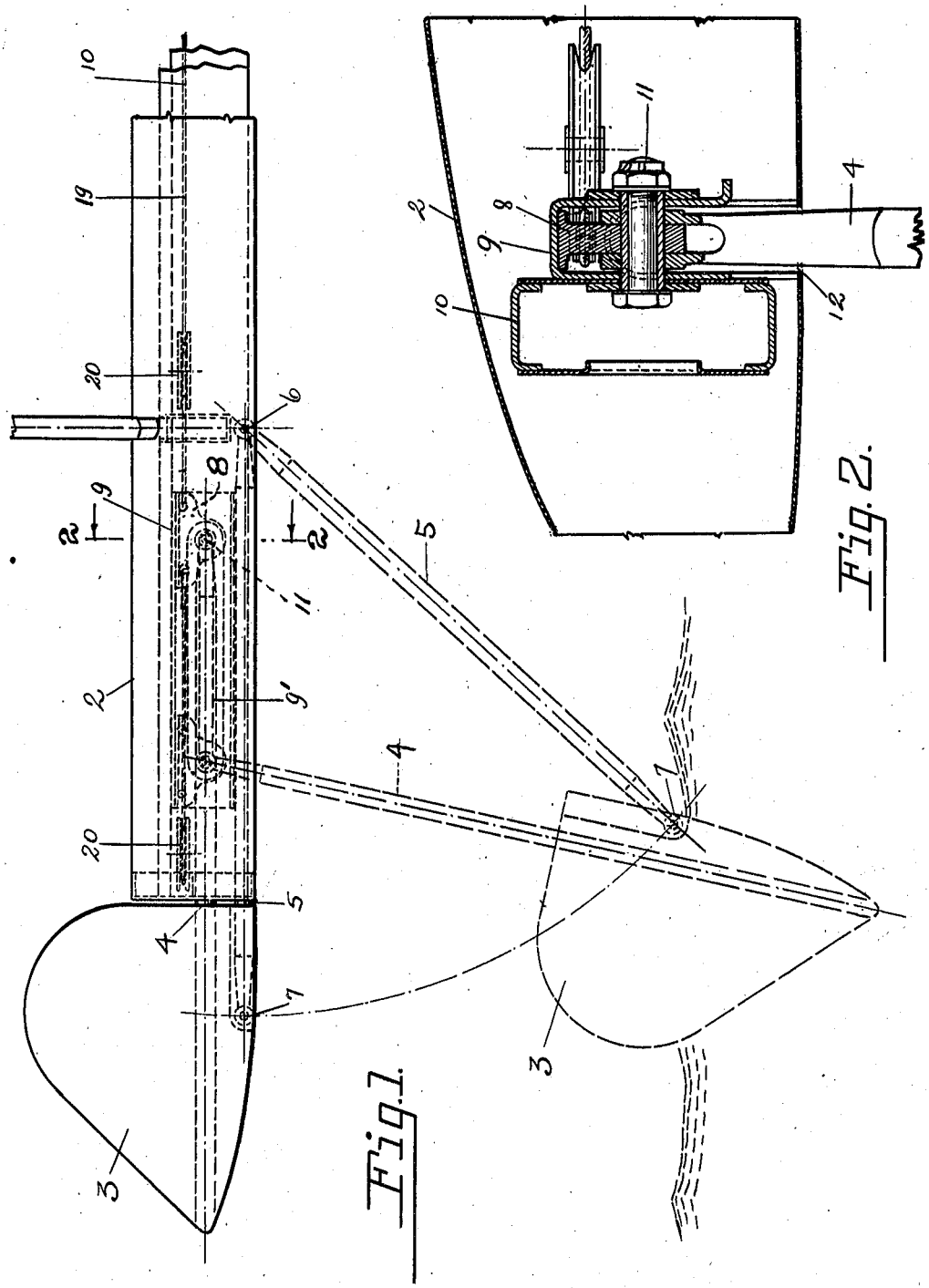
INVENTOR
Clem H. Congdon,
BY  Robert A. Lavender
ATTORNEY

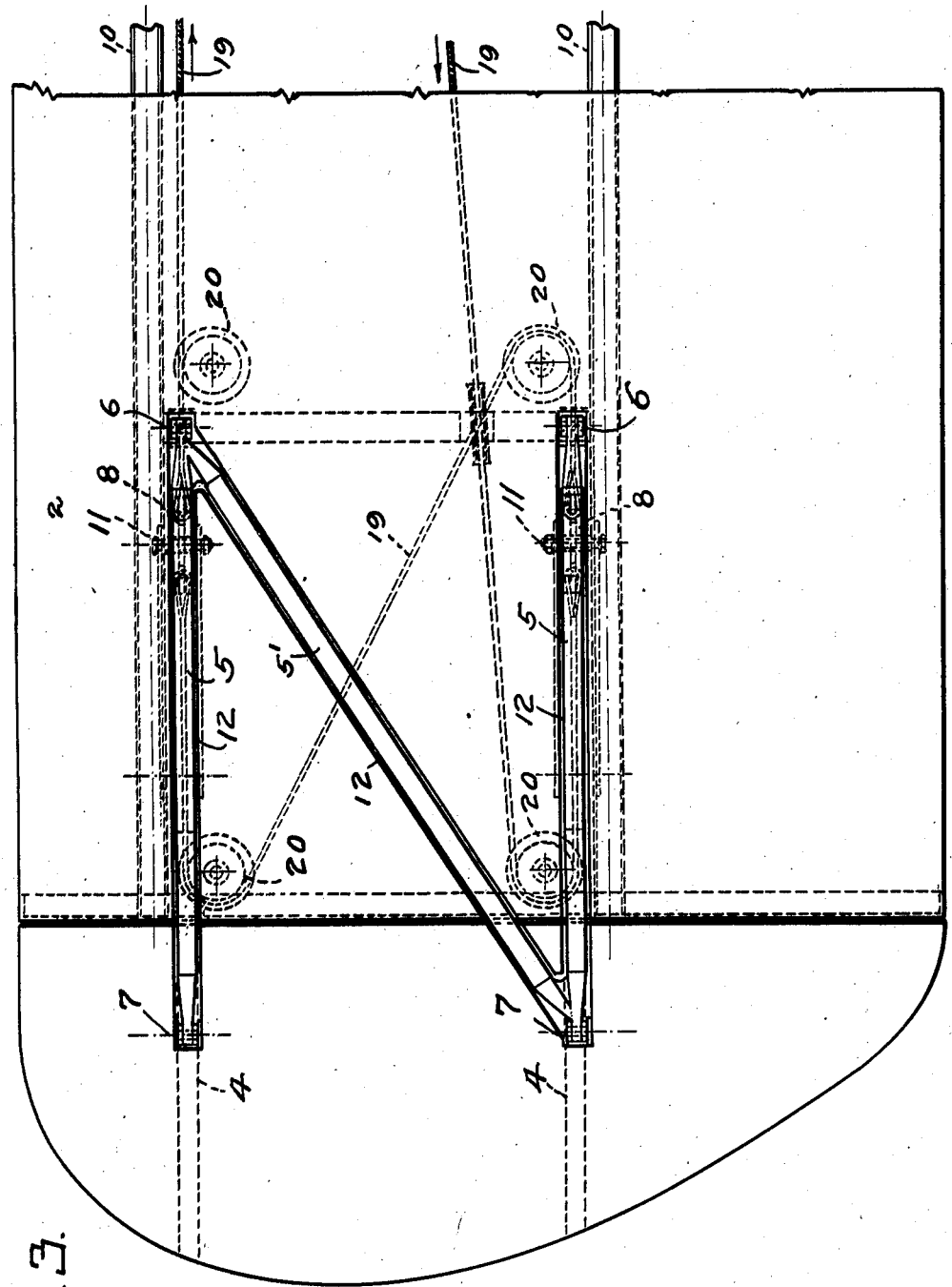

June 24, 1930.  C. H. CONGDON  1,766,167
AIRCRAFT
Filed Feb. 4, 1927   3 Sheets-Sheet 3
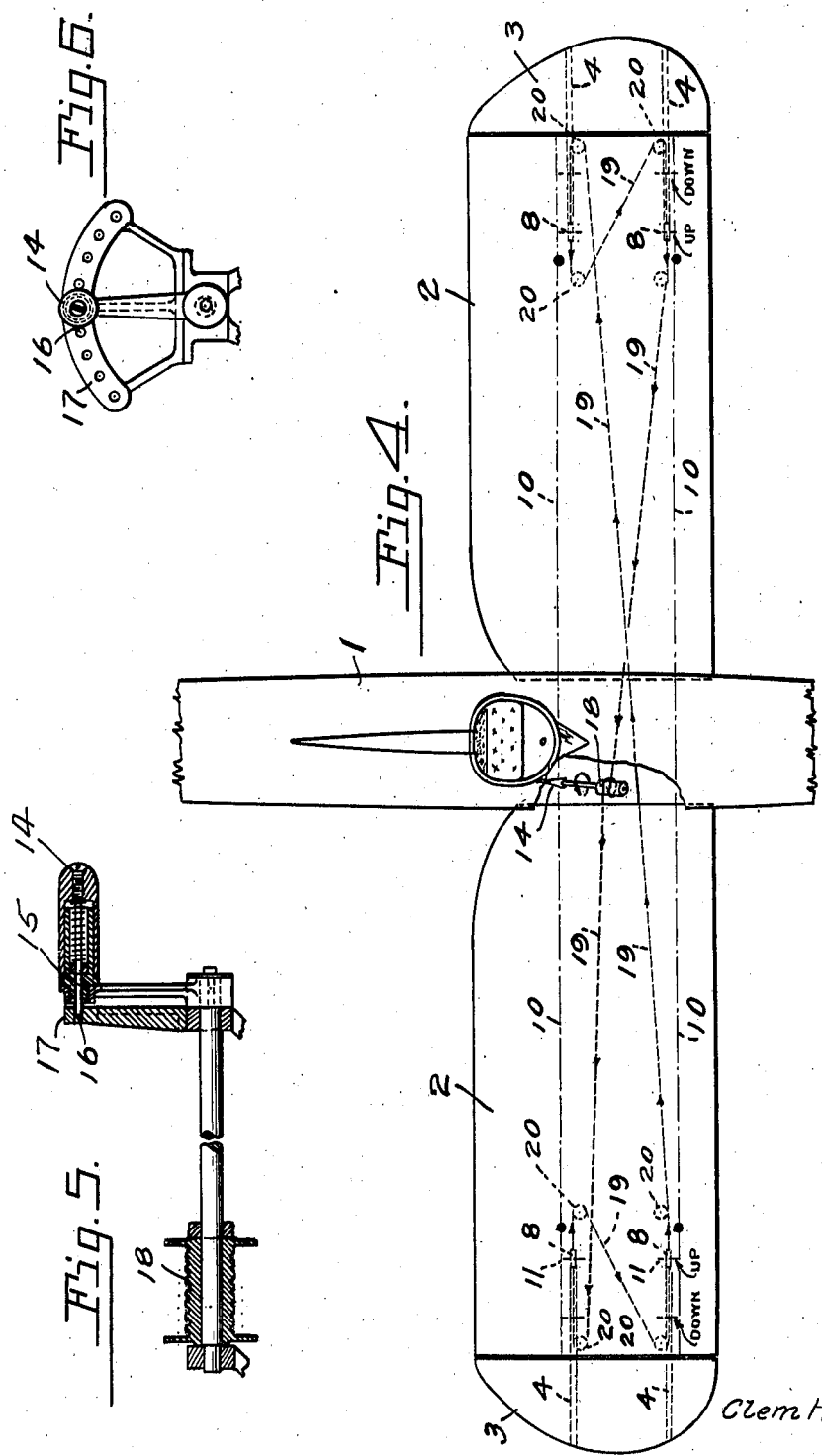
INVENTOR,
Clem H. Congdon,
BY *Robert H. Lowrie* ATTORNEY Patented June 24, 1930

1,766,167

UNITED STATES PATENT OFFICE

CLEM H. CONGDON, OF CLEVELAND, OHIO

AIRCRAFT

Application filed February 4, 1927. Serial No. 165,927.

(GRANTED UNDER THE ACT OF MARCH 3, 1883, AS AMENDED APRIL 30, 1928; 370 O. G. 757)

My invention relates broadly to aircraft and more particularly to the wing construction thereof.

The principal object of my invention is to provide a device that, when in its raised position will function as a wing tip having its under surface flush with the under surface of the wing, and its upper surface projecting above the upper surface of the wing, and when in its lowered position will function as a wing tip float.

Another object of my invention is to form a stream lined protuberance that will prevent the spilling off of air at the wing tip, as is common with the present construction of wing tips.

A further object of my invention is to house the bracing struts of the combination wing-tip float in slots in the lower surface of the wing as a further aid on the reduction of a parasite resistance.

With the above and other objects in view, the invention consists in the construction, combination, and arrangement of parts as will be hereinafter more fully described.

Reference is to be had to the accompanying drawings forming a part of this specification in which like reference characters indicate corresponding parts throughout the several views and in which:

Figure 1 is a partial front elevation of an airplane wing showing the embodiments of my invention, the combined wing tip and the wing tip float being shown by full lines in its raised position and by broken lines in its lowered position.

Figure 2 is an enlarged detail cross sectional view on the line 2—2 of Fig. 1, showing one of the strut guides.

Figure 3, is a partial bottom plan view of an aircraft wing with my wing-tip float in its raised position, and showing the supporting struts located in slots in the under surface of the wing.

Figure 4 is a partial diagrammatic top plan view of an air-craft wing showing an arrangement of actuating cables, location of sheaves, and operating mechanism.

Figure 5 is a detail longitudinal sectional view of an operating crank and winding drum, and—

Figure 6 is a front elevation of the same.

Referring more particularly to the drawings, 1 indicates the body portion of an aircraft and 2 the wings to which are attached the floats or outboard members that have their lower surfaces in this position, flush with the lower surfaces of the wings and their upper surfaces extending above the upper surfaces of the wings. Retractible strut braces 4 and hinged struts 5 connect the floats to the wings. The struts 5, braced by diagonal members 5' are hinged to the wing structure at 6 and to the floats 3 at 7. The braces 4 are rigidly secured at their outer ends to the floats 3 and terminate at their inner ends in slides 8 pivoted on bolts 11, the slides traveling in housing guides 9 secured to wing spars 10. Slots 9' are located in the sides of the housing guides to constrain the travel of pivot bolts 11. When the floats 3 are in raised position the braces and struts are seated in slots 12 in the lower surfaces of the wings.

When it is desired to change the position of the floats, crank handle 14, conveniently located with respect to the pilot, is drawn outwardly to release spring latch bolt 15 from engagement with openings 16 in a rigidly mounted rack 17, permitting the crank to be rotated which in turn rotates drum 18 on which cable 19 is wound. The cable 19 is passed around suitably located pulleys 20 and secured to the slides 8 in such a way that the slides will move either inwardly or outwardly simultaneously.

When the outboard members 3 are in a raised position they form a streamlined protuberance with respect to the wings that will prevent the spilling off of air at the wings tips, as is common with the present construction of wing tips, and when in lowered position provide floats for operation of the aircraft on water.

It will be understood that the above description and accompanying drawings comprehend only the general and preferred embodiment of my invention and that minor changes in detail of construction and arrangement of parts may be made within the scope of the appended claims and without sacrificing any of the advantages of my invention.

The invention herein described may be manufactured and used by or for the Government of the United States for governmental purposes without the payment to me of any royalty thereon or therefor.

Having thus described my invention what I claim is:—

1. In combination with aircraft wings, extensions adjustably attached thereto, the extensions in raised position comprising wing tips flush with the under surface of the wings and projecting above the upper surface thereof, and in lowered position comprising floats, and means for raising and lowering the extensions.

2. In combination with aircraft wings, extensions pivotally connected to the wings, said extensions when in a raised position serving as wing tips and having a streamline protuberance with respect to the upper surface of the wings and when in a lowered position serving as stabilizing floats, and means for raising and lowering the extensions.

3. In combination with aircraft wings, wing tips adjustably attached thereto, said tips being movable entirely without the plane of the wings to serve as stabilizing floats when the aircraft is floating on water, and means for adjusting the wing tips.

4. In combination with aircraft wings having guideways therein, wing tips adjustably attached to the wings, retractile struts connecting the wing tips and wings and operable in the guideways, pivotal struts connected to the wings and wing tips, and means for imparting movement to the retractile struts to lower the wing tips from the wings to serve as stabilizing floats for the aircraft when on water.

5. In combination with aircraft wings, extensions pivotally connected thereto, said extensions when in a raised position being in alignment with the wings providing wingtips that prevent the spilling-off of air, and when in lowered position providing lateral stabilizers for the aircraft, and means for raising and lowering the extensions.

CLEM H. CONGDON.